(12) United States Patent
Csoma et al.

(10) Patent No.: US 12,097,830 B2
(45) Date of Patent: Sep. 24, 2024

(54) VALVE ARRANGEMENT

(71) Applicant: Knorr-Bremse Systeme Fuer Nutzfahrzeuge GmbH, Munich (DE)

(72) Inventors: Zsigmond Csoma, Perbal (HU); David Jakab, Kecskemet (HU); Oliver Udvardy, Budapest (HU); Ravi Katta Shankar, Pune (IN); Balazs Viktor Birkas, Budapest (HU)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 0 days.

(21) Appl. No.: 17/777,797

(22) PCT Filed: Dec. 8, 2020

(86) PCT No.: PCT/EP2020/085069
§ 371 (c)(1),
(2) Date: May 18, 2022

(87) PCT Pub. No.: WO2021/116101
PCT Pub. Date: Jun. 17, 2021

(65) Prior Publication Data
US 2022/0410863 A1 Dec. 29, 2022

(30) Foreign Application Priority Data

Dec. 13, 2019 (EP) .................................... 19216049

(51) Int. Cl.
*B60T 15/02* (2006.01)
*B60T 15/04* (2006.01)
(Continued)

(52) U.S. Cl.
CPC .......... *B60T 15/027* (2013.01); *B60T 15/041* (2013.01); *B60T 15/12* (2013.01); *B60T 15/22* (2013.01); *B60T 15/44* (2013.01); *B60T 17/04* (2013.01)

(58) Field of Classification Search
CPC ...... B60T 15/027; B60T 15/041; B60T 15/12; B60T 15/22; B60T 15/44; B60T 15/20;
(Continued)

(56) References Cited

U.S. PATENT DOCUMENTS 3,944,294 A * 3/1976 Masuda ................ B60T 8/1831
303/9.66
5,709,246 A * 1/1998 Koelzer ................ B60T 17/004
137/204
(Continued)

FOREIGN PATENT DOCUMENTS

| CN | 103359102 A | 10/2013 |
|---|---|---|
| CN | 103541935 A | 1/2014 |

(Continued)

OTHER PUBLICATIONS

International Search Report dated Feb. 23, 2021 in connection with PCT/EP2020/085069.

*Primary Examiner* — Thomas J Williams
(74) *Attorney, Agent, or Firm* — NORTON ROSE FULBRIGHT US LLP; Gerard A. Messina

(57) ABSTRACT

A valve-arrangement is operable to switch between a bistable-valve (BV) behavior and a relay-valve (RV) behavior to control a parking-brake, and includes a housing with a supply-pressure-inlet (SPI), a service brake-control-inlet (SBCI) to provide a control-pressure, a pressure-outlet, and an exhaust-port, and includes a first-piston and a second-piston both movable along a same direction in the housing to define a first-chamber communicating with the SBCI, a second-chamber between the first-piston and the second-
(Continued)

piston, and third chamber communicating with the pressure-outlet and with a controllable connection to the SPI, in which upon the control-pressure the second-piston moves with the first-piston to connect the pressure-outlet with the exhaust-port or with the SPI. The valve arrangement includes a throttle unit adapted, depending on the control-pressure, to connect the second-chamber with the third-chamber to enable the BV behavior or disconnect the second-chamber from the third-chamber to enable the RV behavior.

8 Claims, 4 Drawing Sheets

(51) Int. Cl.
*B60T 15/12* (2006.01)
*B60T 15/22* (2006.01)
*B60T 15/44* (2006.01)
*B60T 17/04* (2006.01)

(58) Field of Classification Search
CPC ......... B60T 15/46; B60T 15/02; B60T 15/18; B60T 17/04; B60T 13/683
See application file for complete search history.

(56) References Cited

U.S. PATENT DOCUMENTS

| | | | |
|---|---|---|---|
| 6,769,744 B2* | 8/2004 | Marsh | B60T 15/20 137/102 |
| 7,077,481 B2* | 7/2006 | Marsh | B60T 15/20 303/118.1 |
| 2021/0237702 A1* | 8/2021 | Beier | B60T 13/36 |
| 2022/0410863 A1* | 12/2022 | Csoma | B60T 15/46 |

FOREIGN PATENT DOCUMENTS

| | | |
|---|---|---|
| CN | 108248591 A | 7/2018 |
| DE | 2427438 A1 | 1/1975 |
| DE | 102010011978 A1 | 9/2011 |
| DE | 102014108558 A1 | 12/2015 |
| DE | 102015104882 A1 | 10/2016 |
| DE | 102016010464 A1 | 3/2018 |
| EP | 0131683 A2 | 1/1985 |
| EP | 0387004 A2 | 9/1990 |
| EP | 0407751 A1 | 1/1991 |
| WO | 2015193102 A1 | 12/2015 |
| WO | 20190234475 A1 | 12/2019 |

* cited by examiner

VALVE ARRANGEMENT

FIELD OF THE INVENTION

The present invention relates to a valve arrangement and, in particular, to a closing feedback throttle used for parking brake bistability in case of anti-compounding.

BACKGROUND INFORMATION

The electronic park brake valve is a bistable valve. However, in case of anti-compounding the park brake valve does not act as a bistable valve but shall act as a simple relay valve. This means, that the bistable behavior is converted to a relay behavior during this function. Anti-compounding refers to a method when it is prohibited that the service brake and the spring brake provide both forces at the same time to a push rod of the brake to avoid a resulting force overshoot.

For electronically controlled brakes this problem can be avoided by software solutions. However, there is also a need for pure mechanical/pneumatic solution—in particular when electrically controlled brakes are not available. Therefore, the brake module of the parking brake shall be able for a pure pneumatic anti-compounding.

FIGS. 4A and 4B depict two conventional valve arrangements that address this problem.

The conventional valve arrangement of FIG. 4A includes a relay valve 400 with two input ports 1, 41 that are connected via a select high valve 425. The service brake is connected to one port 41 and the other port 1 is connected to a control pressure line. In the park state, there is no pressure on an outlet port 2 to hold the vehicle in the parking position by the spring brakes connected thereto. Another port 42 is connected to a secondary service line which provides a control port for the main piston 420. In this arrangement, a pressure coming from a foot brake valve (not shown) will trigger a pressure on the outlet port 2—even if the vehicle is in the parking position. However, the select high valve 425 selects as control input for the relay valve 400 only the maximum pressure being present at the control pressure line 1 and the service brake line 41. Therefore, the foot brake pressure (connected to line 41) generates an outlet pressure on port 2 even in the park state. This pressure is led to the spring brake chamber, which releases the strong spring and thus does not any longer generates a force on the push rod. As a result, in the brake chamber, a force overshoot on the pushrod is avoided by increasing the pressure in the spring brake cylinder while the service brake chamber is activated. This releases the parking brake when the driver steps on the foot brake pedal. Thus, the desired anti-compounding is achieved.

FIG. 4B depicts another conventional valve arrangement with a relay valve 400 that implements an anti-compounding based on software solution in a control unit 450 that controls the various valves. The relay valve 400 is arranged along a line from a pressure supply 11, via a check valve 413 to the parking brake port 21 (with two ports for, e.g., two different spring brakes). The relay valve 400 provides also a connection to an exhaust port 430 to enable a desired pressure adjustment at the parking brake port 21 and a trailer control module port 22.

The arrangement further includes a first solenoid valve 410 and a second solenoid valve 420, wherein the first solenoid 410 is configured to open or close a connection between the trailer control module port 22 and the pressure supply 11. The second solenoid 420 is configured to open or close a connection 470 to an outlet (opposite to the pressure supply 11) of the relay valve 400. The arrangement further comprises first valve unit 441 and a second valve unit 442, wherein the first valve unit 441 is configured to open or close a connection between the pressure supply 11 and a control port 451 of the relay valve 400. The second solenoid valve 442 is configured to open or close a connection between the control port 451 of the relay valve 400 with the exhaust port 430. The valve units 441, 442 are configured to modulate a pressure at the control port 451 by connecting the control port 451 either to the pressure supply 11 or to the exhaust port 430, thereby increasing/decreasing the pressure at the control port 451. Finally, an emergency release line 12 is connected to the control port 451. The release line 12 is a manual back-up line which is used in case of no electricity. Without electricity the spring brakes cannot be released and the vehicle cannot be set in drive state (e.g. for towing purposes if it is broken down). With the help of the line 12 air could be let to the 451 e.g. from external air compressor so the outlet pressure on port 21 will release the spring brakes.

The bistability of the single relay valve 400 is provided in this conventional arrangement by a throttle feedback 415 that connects the working chamber (i.e. the outlet of the relay valve 400) with and the control chamber in the relay valve 400 (i.e. the control port 451) combined with a controlling of the valves 441, 442 by the control unit 450.

However, if the control unit 450 exhibits a failure or a power breakdown, this software-based operation is not available. Therefore, there is a demand for a purely pneumatic solution for the anti-compounding that can in particular be implemented in hardware without relying on a software solution. This hardware solution should implement a change from a bistable behavior of the park brake valve to a relay valve behavior for implementing the anti-compounding.

BACKGROUND INFORMATION

At least some of the problems as described before are overcome by a valve arrangement according to the description herein. The further descriptions herein refer to further advantageous realizations of the subject matter of the main descriptions herein.

The present invention relates to a valve arrangement operable to switch between a bistable valve behavior and a relay valve behavior to control a parking brake. The valve arrangement includes a housing with a supply pressure inlet, a service brake control inlet to provide a control pressure, a pressure outlet, and an exhaust port. The valve arrangement further includes a first piston and a second piston both movable along a same direction in the housing to define a first chamber communicating with the service brake control inlet, a second chamber between the first piston and the second piston, and third chamber communicating with the pressure outlet and with a controllable connection to the supply pressure inlet. In response to the control pressure the second piston is configured to move together with the first piston to connect the pressure outlet with the supply pressure inlet or with the exhaust port. The valve arrangement includes further a throttle unit adapted, depending on the control pressure, to connect the second chamber with the third chamber to enable the bistable valve behavior or to disconnect the second chamber from the third chamber to enable the relay valve behavior.

Optionally, the first piston comprises two radial sealings that are separated from each other in the direction of movement of the first piston. The throttle unit includes an end portion that passes through the housing at a position that is, dependent on a position of the first piston, either between the two radial sealings to close the connection between the second chamber with the third chamber or communicates with the second chamber to open the connection between the second chamber with the third chamber.

Optionally, the controllable throttle unit is formed as a channel through the second piston to connect the second chamber with the third chamber, and the first piston includes a sealing portion adapted to close the channel in the lower position of the first piston where a volume of the first chamber is maximized. It is understood that not only in the lower position the throttle is closed, but already at an earlier stage.

Optionally, the channel through the second piston has a non-constant cross-sectional area to control a flow between the second chamber and the third chamber.

Optionally, the throttle unit includes an additional valve unit. The additional valve unit may be configured to be controlled by a pressure at the service brake control inlet in such a way that the additional valve unit:
- is closed when a volume of the first chamber is maximized to disconnect the second chamber from the third chamber; and/or
- is opened when a volume of the first chamber is minimized to connect the second chamber with the third chamber.

Also here, it is understood that the moment of closure will happen earlier. But since the additional valve unit remains closed it remains closed when the volume is maximized.

Optionally, the open position of the additional valve unit is a default or bias position (e.g. provide by a bias spring), i.e. the additional valve unit may be a monostable valve, where open position is stable.

Optionally, the second piston is pre-strained towards the upper position to open a connection of the pressure outlet to the exhaust port. By applying a control pressure in the second chamber the second piston can be moved in a desired axial position.

Optionally, the third chamber comprises a cross-sectional area which is smaller than a cross-sectional area of the second chamber. Since enables the amplifying effect of the relay valve.

Therefore, embodiments solve at least some of the above-mentioned problems by using an additional relay piston (first piston) and/or a controllable throttle to connect/disconnect a control chamber (second chamber) with a working chamber (third chamber), where the control is implemented by an additional valve or by moving the first piston to change the bistability behavior to a simple relay valve behavior. This solution represents a pure pneumatic anti-compounding for a bistable parking brake. Therefore, in contrast to the conventional parking brake system, this system provides the advantage that it does not rely on software and does not need an additional select-high valve, while maintaining the bistability of the valve. Even in case of a power failure, this pure pneumatic anti-compounding operates reliably for a bistable parking brake valve system.

Some examples of the systems and/or methods will be described in the following by way of examples only, and with respect to the accompanying figures.

DETAILED DESCRIPTION

Figure 1A:
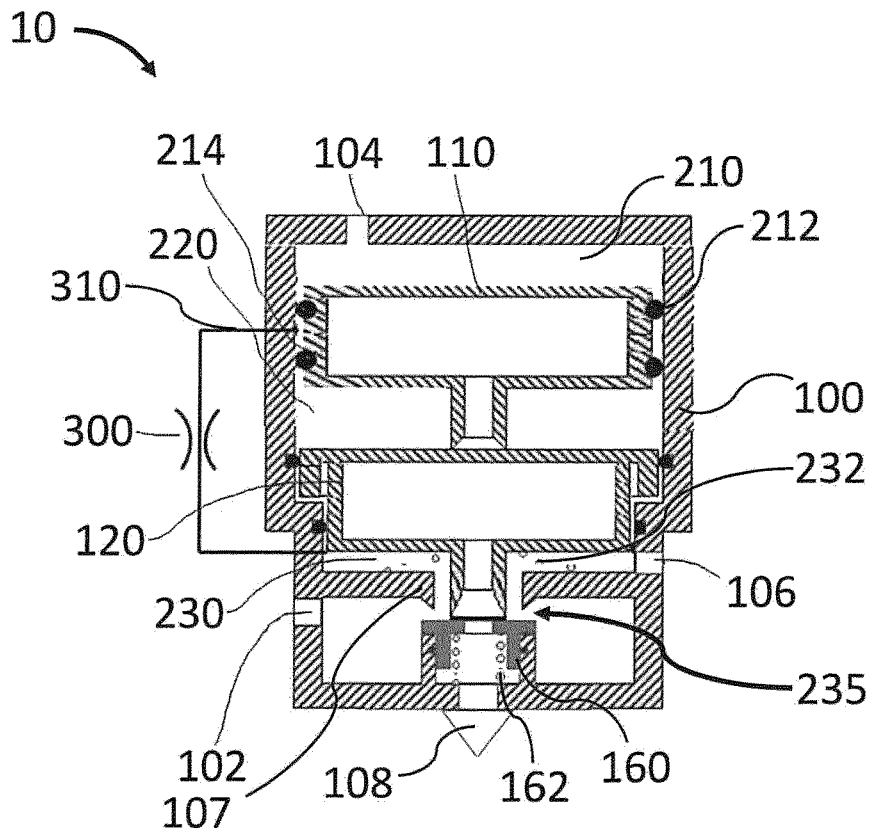
FIG. 1A,1B illustrate the functioning of a valve arrangement according to an embodiment of the present invention that is purely pneumatically switchable between a bistable valve and a relay valve.
Figure 1B:
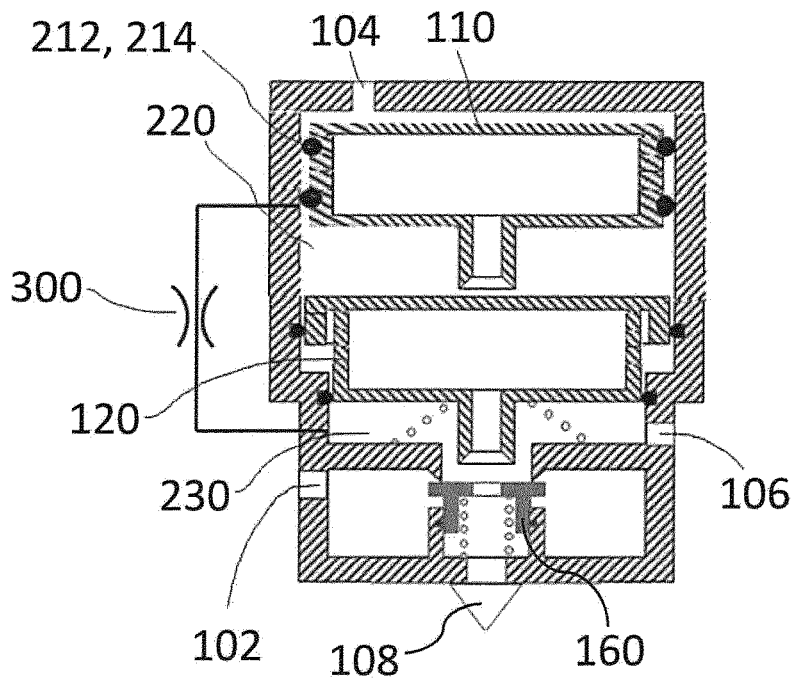

FIGS. 1A, 1B depict a valve arrangement suitable for a parking brake of a commercial vehicle according to an embodiment that is configured to operate as a bistable valve or, alternatively, as a relay valve.

The valve arrangement 10 includes a housing 100 with a supply pressure inlet 102, a service brake control inlet 104 (or service brake line), a pressure outlet 106, and an exhaust port 108. The service brake control inlet 104 may act also as control pressure port and the pressure outlet 106 may be connected with one or more spring brake chambers.

The valve arrangement 10 further includes a first piston 110 and a second piston 120 both movable along a same (axial) direction in the housing 100 to define a first chamber 210, a second chamber 220 and a third chamber 230. The first chamber 210 communicates with the service brake control inlet 104 and is bounded by the housing 100 and the first piston 110. The second chamber 220 is arranged between the first piston 110 and the second piston 120 and is laterally bounded by the housing 100. The third chamber 230 is separated from the second chamber 220 by be second piston 120 and communicates with the pressure outlet 106 and, in addition, via a controllable connection 235 with the supply pressure inlet 102. Finally, the valve arrangement 10 includes a switchable throttle unit 300 adapted to controllably connect/disconnect the second chamber 220 with the third chamber 230.

The third chamber 230 represents a working chamber and includes a first bias spring 232 providing a bias force for the second piston 120 in the direction towards the first piston 110. The controllable connection 235 in the third chamber 230 is provided by a third piston 160 arranged with atop an opening of the exhaust port 108 and is configured to abut, in an upper position, a shoulder portion 107 of the housing 100, thereby closing the connection 235 from the pressure outlet 106 to the supply pressure inlet 102. The third piston 160 is likewise biased by a second bias spring 162 towards the closed position.

The second piston 120 can be pushed by the first piston 110 upon the control pressure from the control pressure control inlet 104 to open the connection between the pressure outlet 106 with the supply pressure inlet 102. When the second piston 120 is lowered—against the first bias spring 232—it pushes the third piston 160 against the second bias spring 162 downward. This opens the controllable connection 235 to the supply inlet 102. At the same time, the exhaust port 108 of the housing 100 will be closed by an abutment of a corresponding sealing portion (lower end) of the second piston 120 to the third piston 160. As long as the second piston 120 abuts the third piston 160, the exhaust port 108 is closed, whereas the connection between the supply pressure inlet 102 and the outlet 106 to the spring brake is at least partially opened. The open position is shown in FIG. 1A and the closed position in FIG. 1B.

FIG. 1A thus illustrates when, during the anti-compound situation, the service brake pressure acts on the first piston 110 and moves it downward to close the feedback throttle 300. The first piston 110 pushes down the second piston 120, which opens the supply inlet 102 to the outlet 106. So, this is not the bistable operation, but rather the relay valve behavior.

FIG. 1B show the situation where the feedback throttle 300 is not closed by the first piston 110. In this situation, the pressure outlet 106 is connected to the exhaust port 108 and no service brake pressure is applied. Since the feedback 300 is open, the valve arrangement 10 will basically operate as a bistable valve. FIG. 1B shows the stable park state, when second piston 120 is in the upper position. When pressurizing the second chamber 220 (but not pressurizing first chamber 110) second piston 120 will go down and reach the stable down position.

According to embodiments, the valve arrangement 10 further includes two (radial) sealings 212, 214 at the first piston 110 which are spaced apart along the axial direction (moving direction of the pistons 110, 120). In addition, the throttle unit 300 is formed at least in part by channels in the housing 100, wherein the upper opening 310 (or upper end portion, i.e. the one that is closer to the first piston 110) of the channel is positioned such that it will be between the two sealings 212, 214 in the lower position of the first piston 110 which will close the throttle unit 300 (see FIG. 1A). In this lower position the volume of the first chamber 210 may be maximal. On the other hand, in the upper position of the first piston 110 (see FIG. 1B), the upper opening 310 is below both sealings 212, 214 to open the connection between the third chamber 230 and the second chamber 220. In this upper position the available volume of the first chamber 210 may be minimal.

As a result, as long as the upper opening 310 through the housing 100 is accessible (as in FIG. 1B) a pressure equalization between the second chamber 220 and the third chamber 230 is provided through the throttle unit 300. However, although the pressure is the same, the force differs due to the different cross-sectional areas of the second chamber 220 (and the first chamber 210) when compared to the third chamber 230. The larger cross-sectional area in the second chamber 220 results in a large force acting on the second piston 120 towards the lower position (shown in FIG. 1A).

In addition, the second chamber 220 may include another control inlet and/or outlet (not shown in FIG. 1A,1B) to control the pressure in the second chamber 220. The bistable behavior of the valve arrangement 10 may be achieved by force equilibrium between forces that push the second piston 120 downward and upward, when the first piston 110 is in the upper position. The forces acting downward originate from the pressure in the second chamber 220 that is caused by the pressure equalization through the throttle unit 300 and/or by the pressure from the other control inlet of the second chamber 220. The forces acting upward come from the first bias spring 232 and from degree of opening of the connection 235 to pressure supply 102. If the pressure atop the second piston 120 is too high, it will move the second piston 120 downward. This will open the connection 235 further, thereby increasing the pressure below the second piston 120. This will in turn move the second piston 120 upward, thereby closing the connection 235. Via the throttle unit 300, the high pressure below the second piston 120 will move in the second chamber 220 to increase there the pressure. Due to the amplifying effect caused by the larger cross-sectional area, this will increase the downward force more than the upward force, which again will lower the second piston 120. This process will continue and yields thus a stable position for the second piston 120.

This situation will end, when the first piston 110 is moved downward caused by inflow in the first chamber 210 and the resulting closure of the throttle unit 300. As a result, no pressure equalization between the second chamber 220 and the third chamber 230 is possible. As a consequence, the valve arrangement 10 acts as a normal relay valve in that the higher cross-sectional area of the second piston 120 or the first piston 110 acts as an amplification for the pressure in the second chamber 220 when compared to the working chamber 230. This situation is depicted in FIG. 1A.

Figure 2:
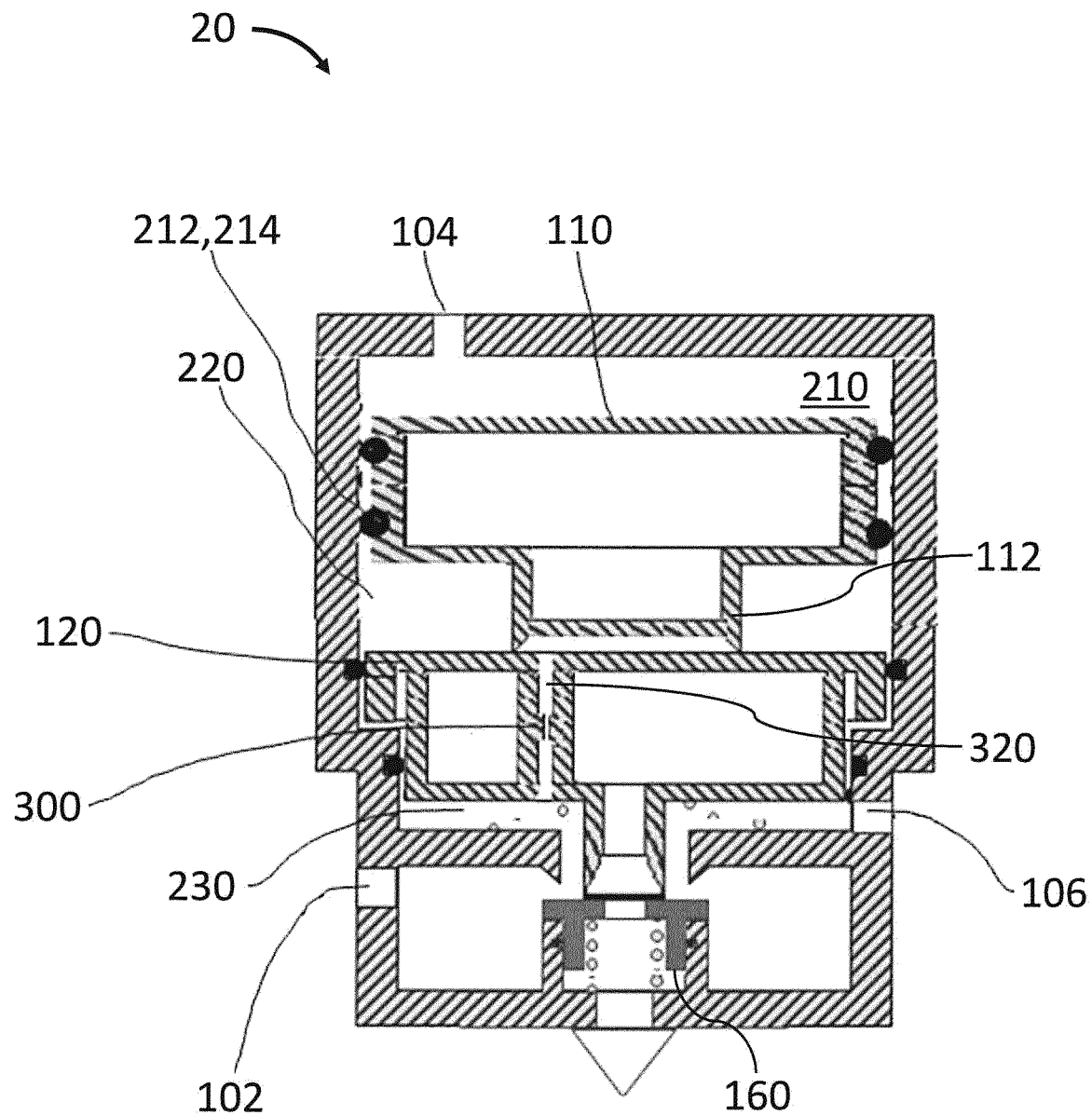
FIG. 2 depicts a valve arrangement according to another embodiment.

FIG. 2 depicts a valve arrangement 20 according to another embodiment. This embodiment differs from the embodiment shown in FIG. 1A, 1B only in the placement of the throttle unit 300. The throttle unit 300 in this embodiment is formed in an axial channel 320 through the second piston 120 and may comprise a narrow portion to implement the throttle behavior. This channel 320 of the second piston 120 is form underneath a sealing portion 112 of the first piston 110 so that it can be closed (opened) by lowering (moving upward) the first piston 110. For this, the sealing portion 112 represents a protruding central portion yielding an axial sealing that closes the throttle channel 320 upon abutting the second piston 120 by the first piston 110.

This embodiment provides the advantage that no opening in the housing 100 is needed—only the second piston 120 has to be replaced by a piston 120 with a channel 320 as depicted in FIG. 2.

All other components and functions are implemented in the same way as in the embodiment of FIG. 1 so that a repeated description is not needed.

FIG. 2 merely shows the axial sealing at the end position of the complete piston movements. The piston movements of the described axial solution are similar to the radial solution (see FIGS. 1A and 1B). This means, the first piston 110 will close the feedback throttle 300 earlier than the second piston touches the third piston 160, which opens the supply pressure 102 to the outlet port 106. This is similar to the embodiments of FIGS. 1A, 1B. For example, the first piston 110 is closer to second piston 120 than second piston 120 to the third piston 160. So, the first piston 110 will first touch second piston 120 and thus close the feedback throttle 300 in this arrangement. Then, the first and second pistons 110, 120 are travelling together (some mm) before the second piston 120 touches third piston 160 and opens the valve component (connection 235, see FIG. 1A).

Figure 3:
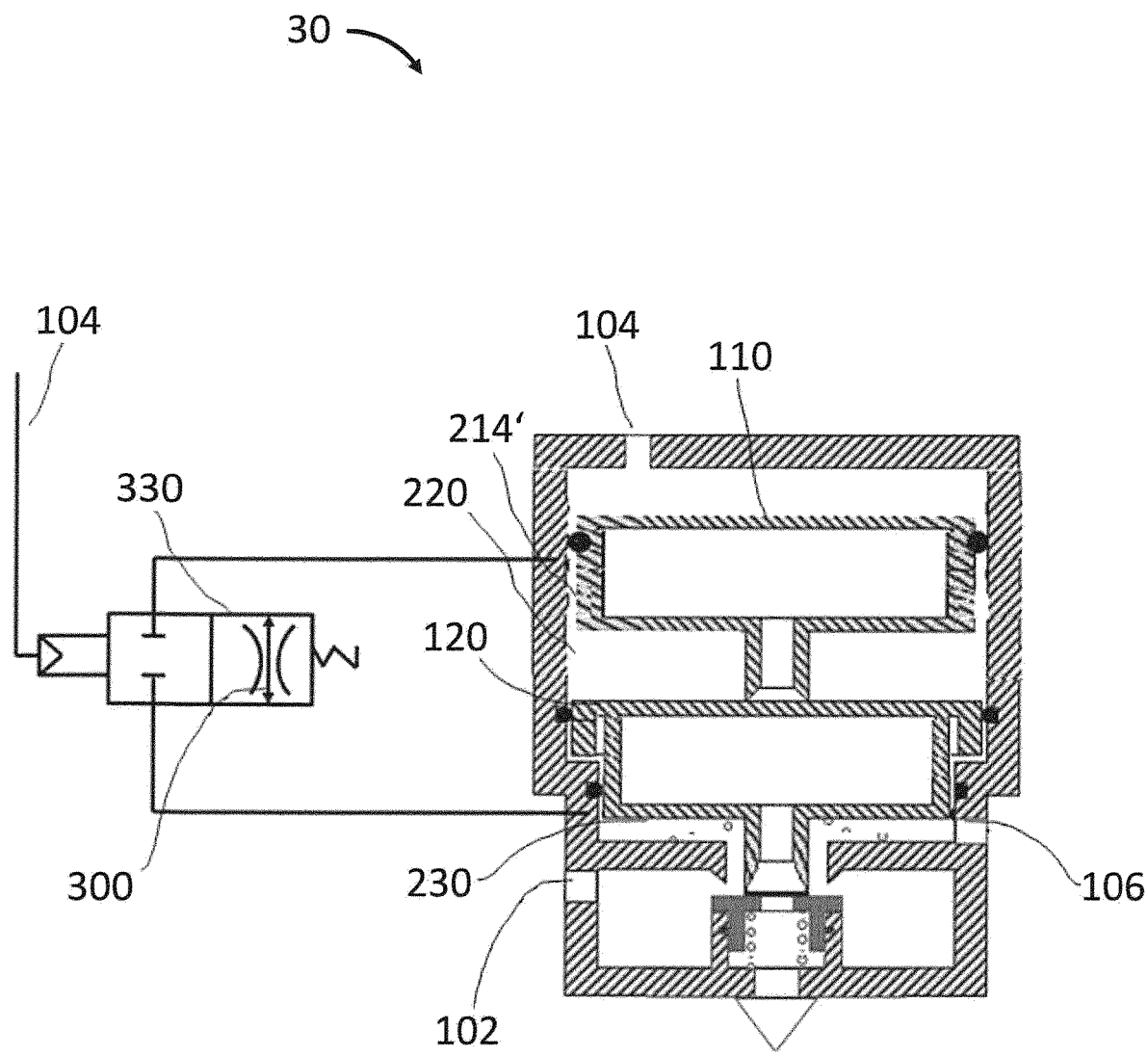
FIG. 3 depicts a valve arrangement according to yet another embodiment.
Figure 4A:
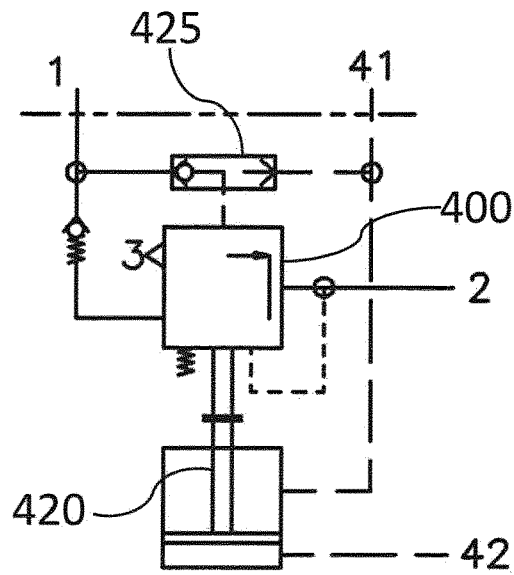
FIGS. 4A, 4B depict two conventional valve arrangements.
Figure 4B:
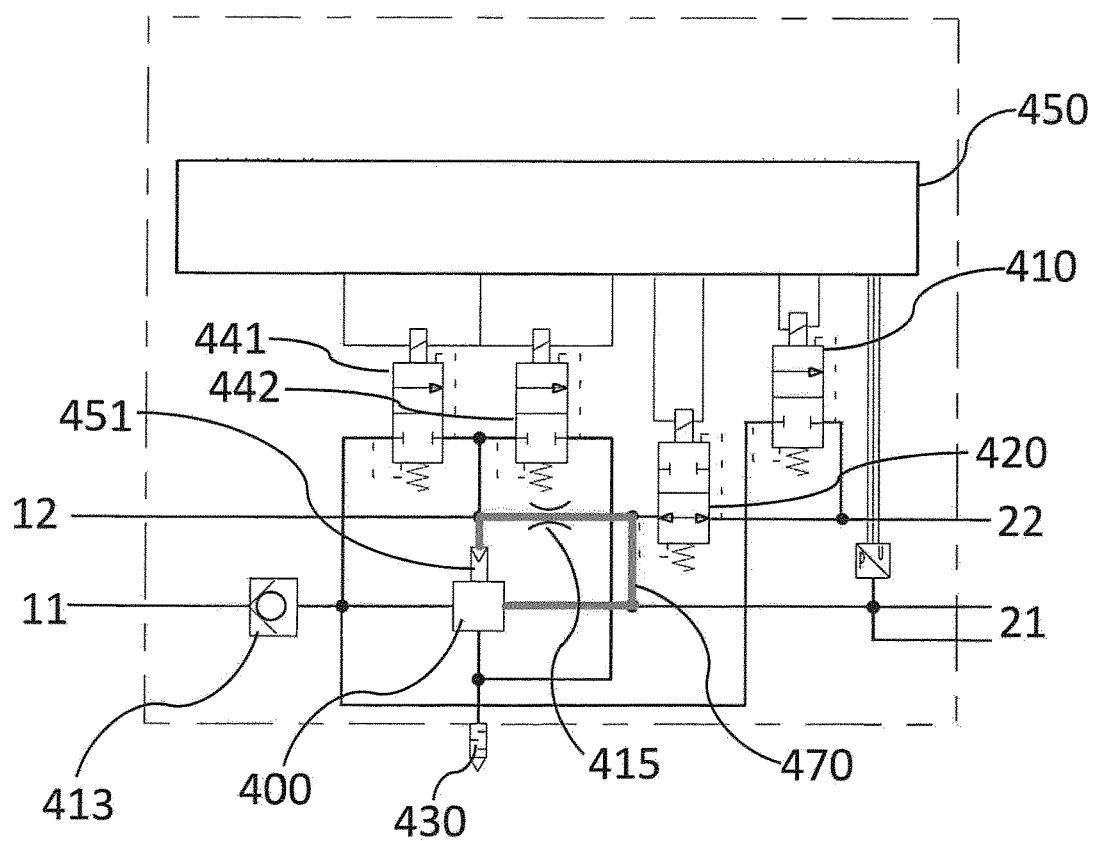

FIG. 3 depicts a valve arrangement 30 according to yet another embodiment. In this embodiment the valve arrangement 30 differs from the valve arrangement 10 as shown in FIG. 1 only in that there is no need for two radial sealings (although they can be provided). The switching of the throttle unit 300 is provided by an additional valve unit 330 which can be controlled by the same pressure as at the service brake inlet 104 (or service brake pressure). This additional valve unit 330 may be mono-stable with a default position, wherein the throttle unit 300 is open (e.g. implemented by a spring bias). By applying a pressure at the service brake inlet 104 the additional valve unit 330 will close the throttle unit 300. In this embodiment, the throttle unit 300 may be arranged along a line that always connects the second chamber 220 with the third chamber 230, i.e. independently of the position of the first piston 110 (or any other piston).

As for the other embodiments, the opening and closing of the throttle unit 300 does not happen at the maximization of the first chamber 110—but at this stage it will remain open and not closed. The service brake is connected to the first chamber 110 and to the additional valve 330. If the service brake pressure applied, the additional valve 330 will more or less immediately be switched to close the feedback throttle unit 300. Parallel hereto, the service brake pressure in first chamber 110 is acting on the first piston 110, which pushes down the second piston 120. Therefore, the closing of the feedback throttle unit 300 (=disconnecting the second chamber 220 from the third chamber 230) is happening not only in the end position where both pistons 110, 120 are in downmost position and first chamber 110 is maximized.

All other components and functions are implemented in the same way as in the embodiment of FIG. 1 so that a repeated description is not needed.

In summary, advantageous aspects of embodiments rely on three different ways of closing and opening the throttle unit 300 in case of operating in the anti-compounding mode or in case of operating in the relay-valve-mode.

In the first case (see FIGS. 1A, 1B), the radial sealings 212, 214 are provided to close/open the throttle unit 300 (or the corresponding end portion of the line) depending on the position of the first piston 110. During a normal braking operation, the working (third) chamber 230 and the control (second) chamber 220 are connected via the throttle line 300 to maintain the bistability of the electronic park brake valve. In case of an anti-compounding, the service brake pressure pushes the anti-compounding piston (first piston 110) down to close the throttle unit 300. As a result, no unwanted pressurizing of the control chamber 220 will occur (which otherwise would occur due to the pressure equalization). Instead of a bistable valve, it is then operated as a normal relay valve.

The second solution (see FIG. 2) relies on an axial sealing 112 of the throttle line 300 provided as a channel 320. By the axial sealing arrangement 112, the throttle unit 300 is implemented not as a separate channel in the housing 100, as in FIG. 1, but as a small throttle 300 in the relay piston 120. This hole (channel 320) is open if the first piston 110 is free, i.e. there is no pressure in the first chamber 210. In case of anti-compounding a service brake pressure is acting on the top area of the first piston 110 so that the first piston 110 moves to the second piston 120, thus closing the channel 320 and the throttle unit 300 to separate the control chamber 220 from the working chamber 230. Again, the valve arrangement 20 acts then as a normal relay valve.

In the third embodiment (see FIG. 3), the closing of the feedback hole is provided with an external or additional valve unit 330. This external valve unit 330 is controlled based on the service brake pressure so that, if no pressure is coming from the service brake line, the additional valve 330 is opened (default position) so that air can flow through the throttle unit 300. If a service brake pressure is applied to the control input 104 and thus also to the control input of the additional valve unit 330 (anti-compounding situation), the additional valve 330 will close the throttle unit 300, thus separating the control chamber 220 from the working chamber 230.

The description and drawings merely illustrate the principles of the disclosure. It will thus be appreciated that those skilled in the art will be able to devise various arrangements that, although not explicitly described or shown herein, embody the principles of the disclosure and are included within its scope.

Furthermore, while each embodiment may stand on its own as a separate example, it is to be noted that in other embodiments the defined features can be combined differently, i.e. a particular feature described in one embodiment may also be realized in other embodiments. Such combinations are covered by the disclosure herein unless it is stated that a specific combination is not intended.

THE LIST OF REFERENCE SIGNS IS AS FOLLOWS 1 control pressure inlet
10,20,30 valve arrangements according to embodiments
41 service brake inlet
100 housing
102 supply pressure inlet
104 service brake control inlet (line)
106 pressure outlet
107 shoulder portion of housing
108 exhaust port
110 first piston (anti-compound piston)
112 axial sealing of the first piston (axial protruding portion)
120 second piston (electronic park brake piston)
160 third piston
162 second bias spring
210 first chamber
212, 214 radial sealings
220 second chamber (control chamber)
230 third chamber (working chamber)
232 first bias spring
235 controllable connection
300 throttle unit (switchable feedback throttle line)
310 end portion of a throttle line
320 channel through the second piston
330 additional valve unit
400 relay valve
410 select high valve
420 main piston
430 control unit

The invention claimed is:

1. A valve arrangement operable to switch between a bistable valve behavior and a relay valve behavior to control a parking brake, comprising:
   a housing with a supply pressure inlet, a service brake control inlet to provide a control pressure, a pressure outlet, and an exhaust port;
   a first piston and a second piston, which are each movable along a same direction in the housing to define a first chamber communicating with the service brake control inlet, a second chamber between the first piston and the second piston, and a third chamber communicating with the pressure outlet and including a controllable connection to the supply pressure inlet, wherein the connection is controlled by a position of the second piston to connect the pressure outlet with the supply pressure inlet or with the exhaust port; and
   a throttle unit adapted, depending on the control pressure, to connect the second chamber with the third chamber, while the second piston moves together with the first piston to enable the bistable valve behavior or to disconnect the second chamber from the third chamber to enable the relay valve behavior;
   wherein the first piston and the second piston are arranged separately.

2. The valve arrangement of claim 1, wherein the throttle unit is formed as a channel through the second piston to connect the second chamber with the third chamber, and the first piston includes a sealing portion adapted to close the channel in the lower position of the first piston where a volume of the first chamber is maximized.

3. The valve arrangement of claim 2, wherein the channel through the second piston has a non-constant cross-sectional area to control a flow between the second chamber and the third chamber.

4. The valve arrangement of claim 1, wherein the second piston is pre-strained towards the upper position to open a connection of the pressure outlet to the exhaust port.

5. A valve arrangement operable to switch between a bistable valve behavior and a relay valve behavior to control a parking brake, comprising:
   a housing with a supply pressure inlet, a service brake control inlet to provide a control pressure, a pressure outlet, and an exhaust port;
   a first piston and a second piston, which are each movable along a same direction in the housing to define a first chamber communicating with the service brake control inlet, a second chamber between the first piston and the second piston, and a third chamber communicating with the pressure outlet and including a controllable connection to the supply pressure inlet, wherein the connection is controlled by a position of the second piston to connect the pressure outlet with the supply pressure inlet or with the exhaust port; and
   a throttle unit adapted, depending on the control pressure, to connect the second chamber with the third chamber, while the second piston moves together with the first piston to enable the bistable valve behavior or to disconnect the second chamber from the third chamber to enable the relay valve behavior;
   wherein the first piston includes two radial sealings that are separated from each other in the direction of movement of the first piston, and wherein the throttle unit includes an end portion passing through the housing at a position that is, dependent on a position of the first piston, either between the two radial sealings to close the connection between the second chamber with the third chamber or communicates with the second chamber to open the connection between the second chamber with the third chamber.

6. A valve arrangement operable to switch between a bistable valve behavior and a relay valve behavior to control a parking brake, comprising:
   a housing with a supply pressure inlet, a service brake control inlet to provide a control pressure, a pressure outlet, and an exhaust port;
   a first piston and a second piston, which are each movable along a same direction in the housing to define a first chamber communicating with the service brake control inlet, a second chamber between the first piston and the second piston, and a third chamber communicating with the pressure outlet and including a controllable connection to the supply pressure inlet, wherein the connection is controlled by a position of the second piston to connect the pressure outlet with the supply pressure inlet or with the exhaust port; and
   a throttle unit adapted, depending on the control pressure, to connect the second chamber with the third chamber, while the second piston moves together with the first piston to enable the bistable valve behavior or to disconnect the second chamber from the third chamber to enable the relay valve behavior;
   wherein the throttle unit includes an additional valve unit, the additional valve unit being configured to be controlled by a pressure at the service brake control inlet so that the additional valve unit is one of:
   (i) closed when a volume of the first chamber is maximized to disconnect the second chamber from the third chamber; or
   (ii) opened when a volume of the first chamber is minimized to connect the second chamber with the third chamber.

7. The valve arrangement of claim 6, wherein the open position of the additional valve unit is a bias position.

8. A valve arrangement operable to switch between a bistable valve behavior and a relay valve behavior to control a parking brake, comprising:
   a housing with a supply pressure inlet, a service brake control inlet to provide a control pressure, a pressure outlet, and an exhaust port;
   a first piston and a second piston, which are each movable along a same direction in the housing to define a first chamber communicating with the service brake control inlet, a second chamber between the first piston and the second piston, and a third chamber communicating with the pressure outlet and including a controllable connection to the supply pressure inlet, wherein the connection is controlled by a position of the second piston to connect the pressure outlet with the supply pressure inlet or with the exhaust port; and
   a throttle unit adapted, depending on the control pressure, to connect the second chamber with the third chamber, while the second piston moves together with the first piston to enable the bistable valve behavior or to disconnect the second chamber from the third chamber to enable the relay valve behavior;
   wherein the third chamber includes a cross-sectional area that is smaller than a cross-sectional area of the second chamber.

* * * * *